MAGNETIC READING AND RECORDING

Filed Jan. 25, 1957 2 Sheets-Sheet 1

INVENTOR
JOHN JOSHUA SHARP
BY Hane and Nydick
ATTORNEYS

Aug. 7, 1962 J. J. SHARP 3,048,831

MAGNETIC READING AND RECORDING

Filed Jan. 25, 1957 2 Sheets-Sheet 2

INVENTOR
JOHN JOSHUA SHARP
BY Howe and Nydick
ATTORNEYS

United States Patent Office 3,048,831

Patented Aug. 7, 1962

3,048,831

MAGNETIC READING AND RECORDING

John Joshua Sharp, Stevenage, England, assignor to International Computers and Tabulators Limited, London, England, a British company Filed Jan. 25, 1957, Ser. No. 636,393
Claims priority, application Great Britain Feb. 6, 1956
7 Claims. (Cl. 340—174.1)

The present invention relates to an improved method or apparatus for recording information signals on a magnetic recording medium.

In electrical calculating or computing machines, magnetic recording e.g. on a drum, disc or tape, is found to be a convenient means for storing information at various stages of operation of the machine, and where the machine requires a large storage capacity it is desirable that the method of recording employed should utilize the recording surface of the magnetic medium in an economic manner in order that the physical size of the store or stores may be kept within reasonable limits.

It is an object of the invention to reduce the amount of circuitry required to effect read-out of recorded signals, by employing a self-clocking system of reading.

It is also the object of the invention to provide an improved system of magnetic recording permitting relatively high packing density coupled with simplified circuitry to be achieved, and to this end the system employs a form of recording with a "zero" represented by one reversal of recording current and a "one" represented by two reversals separated by a short interval.

According to the invention a method of preparing an information bearing record, having binary signals recorded by the magnetic state of discrete areas of the record, which consists in subjecting discrete areas of the record to a magnetic flux of substantially constant amplitude and intermittently reversing the direction of the flux to produce a single reversal of magnetic state within a discrete area recording a binary signal of one kind and a double reversal of magnetic state within a discrete area recording a binary signal of the other kind.

Apparatus for carrying out the method of the invention includes a magnetic recording head positioned adjacent to a magnetizable record, means for producing relative movement between the record and the recording head, a current source adapted to pass a current through a winding, or windings, on the recording head to cause the recording head to subject the record to a magnetic flux of substantially constant magnitude, and means adapted to control the current source in accordance with the binary signals to be recorded to cause intermittent reversals of said magnetic flux to produce a single reversal of magnetic state in a discrete area of the record for a binary signal of one kind and a double reversal of magnetic state in a discrete area of the record for a binary signal of the other kind.

Apparatus for reading a magnetic record prepared in accordance with the method of the invention includes means for producing relative movement between the record and a magnetic reading head, which is adapted to generate a signal for each change of magnetic state of the discrete areas of the record, and gating means controlled by the signals from the reading head to produce an output signal in response to the occurrence of reading head signals produced by a double reversal of magnetic state of a discrete area.

The invention will now be described, by way of example, with reference to the accompanying drawings, in which.

Figures 1, 2:
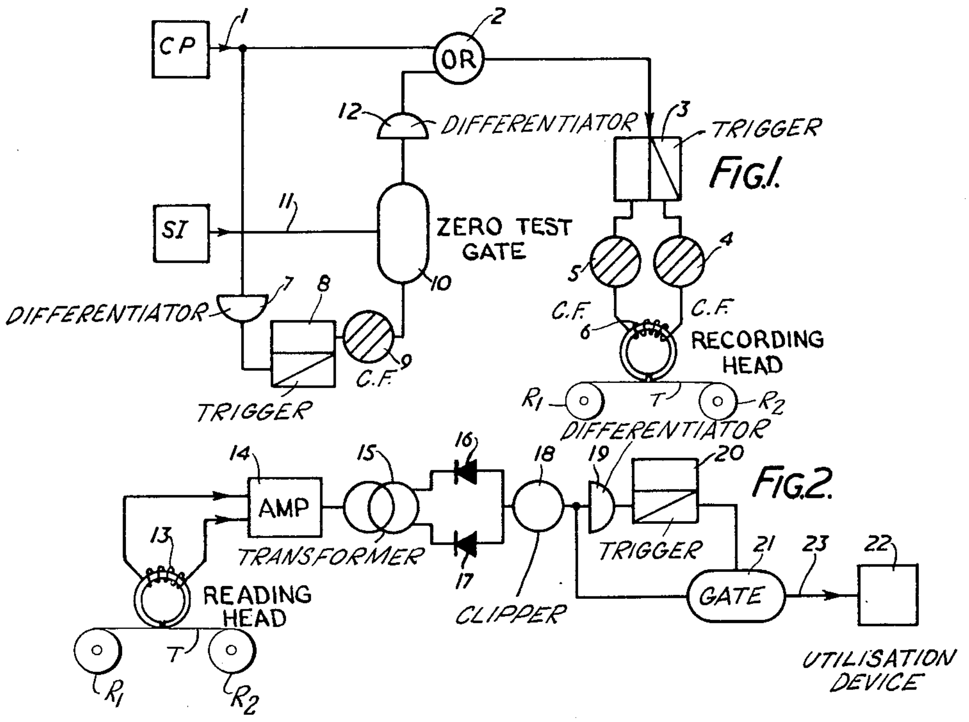
FIGURE 1 is a schematic diagram of recording arrangements according to the invention.
FIGURE 2 is a schematic diagram of the corresponding reading arrangements.

Referring now to FIGURE 1, timing or clock pulses from a suitable source CP, which may, for example be the clock pulse generator of a calculating machine, are applied over lead 1 to an OR gate 2 the output of which serves to drive a bistable trigger circuit 3. The circuit 3 has cathode followers 4 and 5 in its two output circuits serving to supply current to a recording head indicated schematically at 6. The trigger circuit 3 may be a conventional trigger circuit constituted by a pair of cross coupled valves, the anode circuits of which feed the cathode followers 4 and 5, and such circuit functions to effect in response to each pulse on line 1 a reversal of the current through the recording head 6. The head 6 is arranged to record on a magnetic record which is schematically illustrated as a magnetic tape T driven between a supply reel R1 and a takeup reel R2.

The pulses on line 1 are also applied through a differentiating circuit 7 to a test pulse generating trigger 8, the output of which is applied, via a cathode follower 9, to a zero test gate 10. This gate is controlled by a potential on line 11 which is high when a "zero" signal is to be recorded and low when a "one" signal is to be recorded, such potentials being supplied by a signal input circuit SI. When a "zero" is to be recorded the test gate 10 is closed and the current in the recording head is reversed once by a pulse on line 1, such current being reversed again if a second "zero" is to be recorded, and so on. If, however, a "one" is to be recorded the low potential on line 11 opens gate 10 and the test pulse from trigger 8 passes through to be differentiated by a differentiating circuit 12 and applied to the OR gate 2.

The pulse applied to circuit 12 is a positive going square wave pulse and it is the differentiated trailing edge of this pulse which is applied, through gate 2, to the trigger 3, to switch the trigger over a short time after it has been switched by the original pulse on line 1. There are thus two successive reversals of the current through the head 6 when a "one" is to be recorded.

Figure 3:
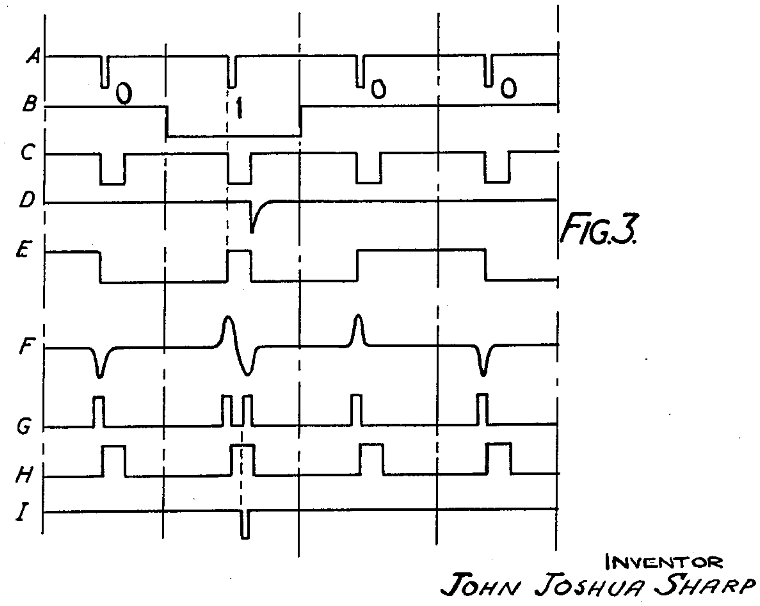
FIGURE 3 shows some of the waveforms associated with the arrangements of FIGURES 1 and 2.

This is illustrated by the waveform diagram of FIGURE 3 which shows, at lines A and B, the clock pulse and signal input waveforms respectively applied to lines 1 and 11, at C the output of the test pulse generator 8, at D, the effective input to gate 2 from the differentiating circuit 12, and at E, the form of the recording voltage applied to the head 6. The duration of the digit periods is indicated by chain dotted lines.

The arrangement described above may be modified to operate with pulse input signals instead of a continuous input signal with one of two polarities. If a "zero" and a "one" are represented by the absence and presence of a pulse respectively, the gate 10 is arranged to be closed in the absence of a signal and to be opened to pass the test signal by a "one" pulse. For a signal in which a "zero" and a "one" are represented by a positive and a negative pulse, respectively, the gate 10 will operate in a manner similar to that described in relation to a continuous signal. However, in this case the clock pulse source may be dispensed with if desired, the pulses on the line 1 being generated by an amplifier similar to one described hereinafter, which produces a negative output pulse in response to either a positive or a negative input pulse, the amplifier being driven by the input signal. The input signal is delayed before application to the gate 10 sufficiently to ensure correct gating action.

Referring now to FIGURE 2, the signals read by a reading head 13 are applied to an amplifier 14 feeding the primary winding of a transformer 15. The secondary winding of transformer 15 is centre-tapped, and two diodes 16 and 17 are connected in circuit with this winding to form a full wave rectifier. The rectifiers feed a pulse clipping stage 18 which yields positive going pulses corresponding to each flux reversal or reversal of magnetic state in the recording being read, i.e. a single pulse when a "zero" is read and a pair of pulses when a "one" is read, for signals recorded in the manner described above.

These pulses are applied through a differentiating circuit 19 and the trailing edges of the pulses used to trigger a strobe pulse generator 20, the output of which is a pulse which does not terminate until after the possible occurrence of the second pulse of a pulse pair indicating a "one" signal. The output of the generator 20 is applied to control a gate 21, to the input of which the pulses from the clipper circuit 18 are applied. The single pulse representing a "zero" thus initiates the opening of gate 21 but there is no subsequent pulse during the stroke duration to pass through the gate, and there is therefore, no output. In the case of a "one" however, the first pulse initiates the opening of gate 21 to allow the second pulse to pass through and there is therefore an output pulse for each "one" read. Such pulse is applied to a utilization device 22 over line 23.

The waveforms involved in reading the signals 0, 1, 0, 0 are shown at lines F–I of FIGURE 3. Line F shows the output of the amplifier 14, line G shows the output of the clipper circuit 18, line H shows the output of the strobe pulse generator 20 and line I shows the signal input to the utilization device 22.

The method of recording above described when applied to magnetic tape recording using a gap of 0.0005 inch in the recording head and a tape speed of 100 inches per second, permits a theoretical time separation between digits of 7 $\mu$secs. which corresponds to a packing density of over 1400 digits per inch. Moreover, since the recording head is always saturated in one direction or the other by the recording current any recording already present on the tape is automatically erased as recording proceeds. It will be appreciated that the method of recording is equally applicable to other forms of magnetic information storage device, such as a drum or disc, in which there is relative movement between a magnetizable medium and a recording head. Since the recording arrangement provides for representing a signal by either a single or a double reversal of flux, each signal must be of binary form, that is, it must be either of two possible kinds or conditions. However, non-binary information may be recorded by groups of the binary signals according to a code such as the international telegraph code or one of the many forms of binary-coded decimal representations. The signals of a code group may be recorded successively on one track, or they may be recorded on a plurality of parallel tracks.

Figures 4, 5:
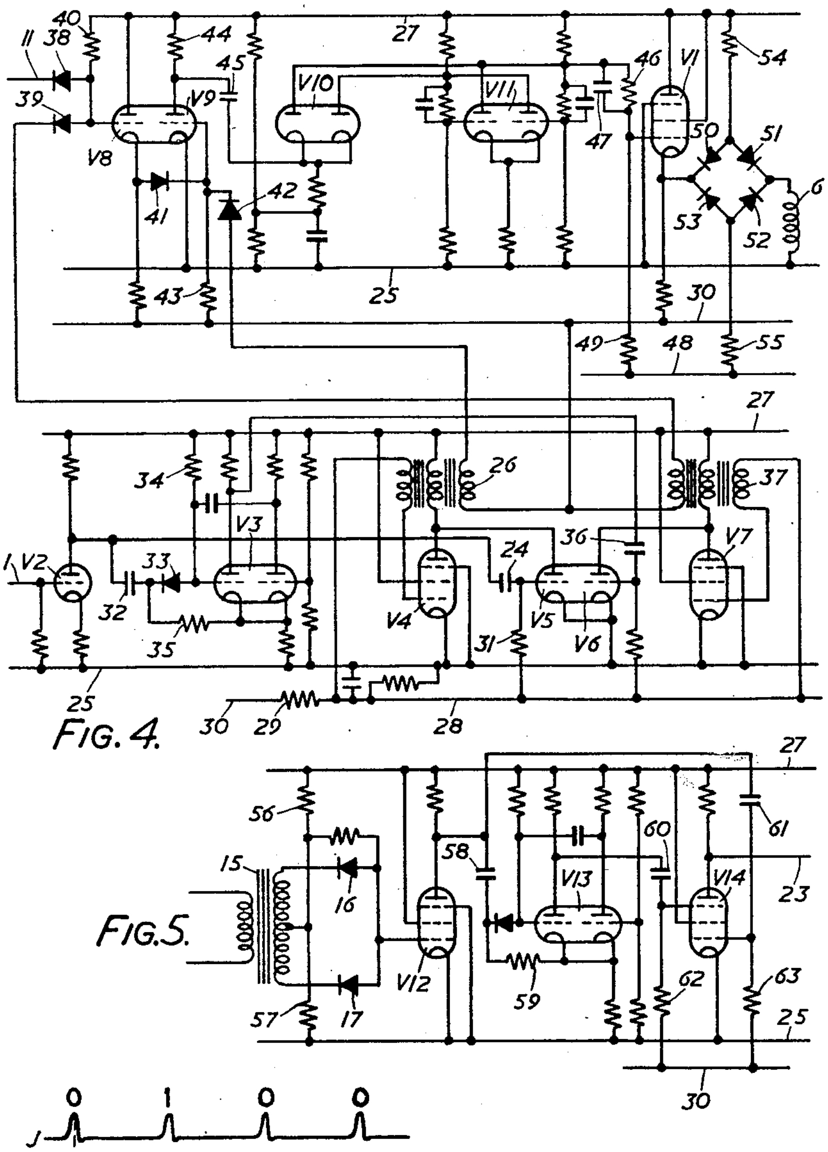
FIGURE 4 is a circuit diagram of the arrangement shown in FIGURE 1 slightly modified.
FIGURE 5 is a circuit diagram of the arrangements shown in FIGURE 2.

A modification of the arrangement shown in FIGURE 1 will now be described with reference to the circuit diagram shown in FIGURE 4.

Negative clock pulses on the line 1 are applied to an inverter V2 to produce positive pulses. These are fed via a capacitor 24 to the grid of a triode V5, the anode of which is connected to the anode of a blocking oscillator valve V4. The cathode of V4 is connected to an earth line 25 and the anode is connected through the primary of a transformer 26 to a 250 volt positive supply line 27. A secondary winding of the transformer 26 is connected between the grid of V4 and a line 28 which is kept at a low potential by virtue of a connection through a resistor 29 to a −50 volt supply line 30.

The grid of V5 is connected through a resistor 31 to the line 28 and the valve is normally cut off, but on the occurrence of a clock pulse on line 1 it is driven into conduction and draws current through the primary of the transformer 26. This triggers the blocking oscillator producing a positive pulse in the output winding of the transformer. This output is utilized as one input to a gate corresponding to the OR gate 2 of FIGURE 1.

The output from V2 is differentiated by a capacitor 32 and a resistor 35 and applied through a diode 33 to the left hand grid of a double triode V3. V3 is connected to function as a monostable flip-flop and has its left hand grid connected through a resistor 34 to the line 27 as well as being connected to the anode of diode 33.

The back edge of a positive clock pulse from V2 serves to trigger the flip-flop, producing a positive pulse on the left hand anode. This output is fed via a capacitor 36 to the grid of a triode V6 which acts as a driver for a blocking oscillator V7. V6 and V7 function in a similar manner to V5 and V4 respectively.

The positive output from V7 is taken from the output winding of a transformer 37 and is used as one input to a zero test gate which corresponds in function to the gate 10 (FIGURE 1).

Figure 6:
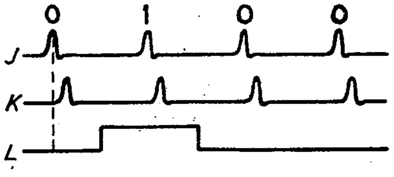
FIGURE 6 shows some of the waveforms associated with the circuit of FIGURE 4.

As V6 is controlled by the triggering action of V3 and V5 is driven directly from the output of V2, the output from the transformer 37 is delayed on that from transformer 26, the difference in timing being equal to the time difference required between the two reversals of current when a "one" is recorded. The output waveforms from the transformers 26 and 37 are shown at J and K respectively of FIGURE 6.

The zero test gate comprises two gating diodes 38 and 39. The cathode of 39 is connected to the output winding of transformer 37 and the cathode of 38 to the control line 11. The anodes of the diodes are connected to the grid of a cathode follower V8, and, via a resistor 40, to the line 27.

The return connection of the output windings of the transformers 26 and 37 is taken to the line 30 so that gate 39 is normally open and the output from the cathode follower is low.

In the absence of any control by the line 11 a positive pulse from V7 closes the gate 39 and causes the grid potential of V8 to rise and the cathode potential follows.

In the arrangement of FIGURE 1, gate control voltages and gate operating pulses are negative. In the circuit of FIGURE 4, gating is effected on positive pulses and a reversal of control voltages on line 11 is required. For the operation of this circuit the line 11 is held negative when a "zero," is to be recorded and positive for a "one." This is shown at L in FIGURE 6.

When a "one" is to be recorded the gate 38 is closed by virtue of a positive potential on line 11 and the valve V8 operates as described above. When a "zero" is to be recorded the line 11 is negative and the closing of gate 39 does not result in an appreciable rise in grid potential as conduction is maintained through the diode 38. Thus the output from the cathode follower remains low for a "zero."

The gate corresponding to 2 (FIGURE 1) comprises two diodes 41 and 42, the cathodes of which are connected to the grid of a triode V9. The grid is normally held at a low potential by a connection through a resistor 43 to the line 30. The output from V9 appears across an anode load resistor 44 and is taken via a capacitor to the cathodes of a double diode V10. V10 acts as a driver valve for a conventional trigger, V11 and its associated components, which corresponds in function to the trigger 3 of FIGURE 1. Successive negative pulses applied to the cathodes of V10 trigger V11 into its opposite stable condition.

A positive pulse from transformer 26 through the diode 42 serves to trigger V11 once. If a "zero" is to be recorded, no change in the cathode potential of V8 occurs and so no further triggering pulse is applied to V10 until the next digit is to be recorded.

If a "one" is to be recorded, a positive pulse appears on the cathode of V8 as described above. This pulse is applied to the grid of V9 via the diode 41 and triggers V11. As the pulse from the transformer 37 occurs after the corresponding pulse from transformer 26, the trigger V11 is operated twice to record a "one."

The output from V11 can be taken from the two anodes to cathode followers 4 and 5 (FIGURE 1) which may drive a single winding or two separate windings on the recording head, or the recording head can be driven from a gating bridge controlled by the output of a single cathode follower V1. V1 is a pentode valve with the grid connected to the left hand anode of V11 via a resistor 46 shunted by a capacitor 47. The grid is also connected through a resistor 49 to a 250 volt negative line 48. The output from V1 controls a bridge circuit comprising four gating diodes 50, 51, 52 and 53. The anodes of 50 and 51 are connected via a resistor 54 to the line 27 and the anodes of 52 and 53 are connected via a resistor 55 to the line 48. The cathodes of 50 and 53 are connected to the cathode of V1 and the recording head 6 is connected between the earth line 25 and the cathodes of 51 and 52.

When the cathode potential of V1 is high, gates 50, 52 and 53 are closed and the recording head is fed with current from the positive line 27 via the diode 51. When the cathode potential of V1 is low, diode 50 conducts and lowers the potential of the anodes of 50 and 51, closing gate 51. Current then passes to the head from the negative line 48 through the diode 52. Thus the current through the head is reversed each time V11 is triggered.

The circuit of the reading arrangement shown in FIGURE 2 will now be described with reference to FIGURE 5. The centre tap of the secondary of transformer 15 is taken to the junction of two resistors 56 and 57 which form a potential divider between lines 27 and 30. The anodes of diodes 16 and 17 are connected to the grid of a pulse clipping valve V12. The output from V12 is differentiated by means of a capacitor 58 and a resistor 59 and the back edge of the pulse is used to trigger a monostable flip-flop comprising V13 and its associated components. V13 corresponds to the strobe pulse generator 20 (FIGURE 2) and gives a positive output pulse the duration of which does not include the time of the first pulse, but does overlap the time of the second pulse of a pulse pair, representing a "one." The output of V13 is applied via a capacitor 60 to the suppressor grid of a pentode V14 which functions as the gate 21 (FIGURE 2). The control grid of V14 is controlled by the output of V12 via a capacitor 61. The suppressor and control grids of V14 are connected through resistors 62 and 63 respectively to the line 30, so the valve is normally cut off. A single positive pulse, representing a "zero" is applied to the suppressor grid but the valve remains nonconducting as there is no subsequent pulse applied to the control grid during the duration of the strobe pulse on the suppressor grid. There is therefore, no output on the line 23 from the anode of V14.

In the case of a "one," however, the second pulse of the pair is applied to the control grid of V14 within the duration of the stroke pulse on the suppressor grid so the valve conducts and produces a negative pulse on line 23, representing a "one."

I claim:

1. Apparatus for recording binary signals in discrete areas of a magnetizable record including a magnetic recording head positioned adjacent the record; means for producing relative motion between the record and the recording head; a current source for passing a current through a winding on the recording head to cause the head to subject the record to a magnetic flux of substantially constant magnitude; a bistable trigger circuit controlling the current source such that switching of said trigger circuit reverses the direction of the magnetic flux; a source of clock pulses synchronized with the binary signals to be recorded; a pulse generator responsive to each clock pulse to produce a pulse delayed relatively to said clock pulse; a gating circuit responsive to said delayed pulses and to each binary signal of one kind to produce a delayed output pulse; and means for applying said clock pulses and said delayed output pulses to said trigger to effect switching thereof, the clock pulse and the delayed output pulse occurring during the period of a binary signal of said one kind each causing switching of the trigger to record said one kind of signal by two flux reversals in a discrete area, and the clock pulse occurring during the period of a binary signal of the other kind causing switching of the trigger to record said other kind of signal by one flux reversal in a discrete area.

2. Apparatus for recording binary signals in discrete areas of a magnetizable record including a magnetic recording head positioned adjacent the record; an arrangement of bridge connected diodes; a fixed voltage source connected across one diagonal of the bridge; a winding on the recording head and a variable voltage source connected in series across the other diagonal of the bridge; a bistable trigger circuit controlling said variable voltage source and having applied thereto a first pulse corresponding to each binary signal to be recorded and a second pulse, delayed relatively to said first pulse, corresponding to each binary signal of one kind, said pulses each causing switching of said trigger circuit and said variable voltage assuming one or other of two values dependent upon the state of the trigger such that current flows through said winding in one direction or the opposite direction to cause the head to subject the record to a magnetic flux of substantially constant magnitude, the direction of which is dependent on the state of the trigger circuit; and means to produce relative motion between the head and the record to bring said discrete areas in turn under the influence of the flux whereby binary signals of one kind are recorded by two reversals of magnetic state and binary signals of the other kind are recorded by one reversal of magnetic state within a discrete area.

3. Apparatus for reading binary signals recorded on a magnetizable record, binary signals of one kind being recorded by two reversals of magnetic state and binary signals of the other kind being recorded by a single reversal of magnetic state within a discrete area of the record, including a magnetic recording head located adjacent the record; means for producing relative motion between the record and the reading head to cause the reading head to sense progressively the discrete areas of the record and generate a signal for each reversal of magnetic state sensed; a transformer having a primary winding receiving the signals from the reading head and a centre tapped secondary winding; two diodes connected one to each half of the secondary winding, to produce a pulse of one polarity in response to the sensing of each reversal of magnetic state; means operative to delay said pulses; and a gating circuit controlled by said pulses and said delayed pulses, the delay being such that the gating circuit produces an output in response to two successive signals from sensing two reversals of magnetic state within a single discrete area of the record.

4. A method of preparing an information bearing record, having at least one binary signal of one kind and at least one binary signal of the other kind recorded thereon by reversal of magnetic state within discrete areas of the record, including the steps of subjecting a first portion of one discrete area to a magnetic flux of substantially constant magnitude; reversing the direction of the magnetic flux and subjecting a second portion of said one discrete area to the reversed magnetic flux; reversing the direction of the magnetic flux a second time and subjecting a third portion of said one discrete area to the magnetic flux to record a binary signal of one kind; subjecting a first portion of another discrete area to the magnetic flux; reversing the direction of the magnetic flux and subjecting a second portion of said other discrete area to the reversed magnetic flux to record a binary signal of the other kind.

5. Apparatus for recording binary signals by reversal of magnetic state in discrete areas of a magnetizable record, said signals being recorded one within each discrete area, comprising a magnetic recording head located adjacent the record; a winding on said head; means producing relative motion between the head and the record to move discrete areas successively past the head; a current source for passing a current through the winding to subject progressively each discrete area in turn to a magnetic flux of substantially constant magnitude; a control means operative, in correspondence with each binary signal to be recorded, to reverse the direction of current flow to cause a first reversal of direction of magnetic flux during passage past the recording head of one of the discrete areas; and switching means, responsive to binary signals of one kind only, to operate the control means to cause a second reversal of direction of magnetic flux during passage past the head of one of the discrete areas; whereby a binary signal of one kind is recorded by two spaced reversals of magnetic state within a discrete area and a binary signal of the other kind is recorded by a single reversal of magnetic state within a discrete area of the record.

6. Apparatus as claimed in claim 5 in which the control means includes a bistable trigger circuit, having two stable states corresponding respectively with the two opposite directions of current flow in the winding; and means to apply to the trigger circuit a first switching pulse effective to switch the trigger in correspondence with each binary signal to be recorded; and in which the switching means responsive to binary signals of one kind only is operative to apply to the trigger circuit a second pulse effective to switch the trigger, delayed relatively to said first pulse, on the occurrence of binary signals of said one kind, each said first and each said second pulse causing switching of the trigger circuit from one stable state to the other stable state.

7. Apparatus for reading binary signals recorded on a magnetizable record, binary signals of one kind being recorded by two reversals of magnetic state and binary signals of the other kind being recorded by a single reversal of magnetic state within a discrete area of the record, including a magnetic reading head located adjacent the record; means to cause the reading head to sense progressively the discrete areas of the record and generate a signal for each reversal of magnetic state sensed; means operative in response to each said signal generated to produce a uni-directional pulse; means operative to delay the signals so that the first of two signals generated in response to two reversals of magnetic state in a single discrete area, when delayed occurs concurrently with the pulse arising from the second of said two signals; and a gating circuit controlled by said unidirectional pulses and said signals delayed to produce an output only in response to two successive signals generated in response to sensing two reversals, in either direction, of magnetic state within a single discrete area of the record.

References Cited in the file of this patent

UNITED STATES PATENTS

| | | |
|---|---|---|
| 2,700,155 | Clayden | Jan. 18, 1955 |
| 2,704,361 | Pouliart | Mar. 15, 1955 |
| 2,734,186 | Williams | Feb. 7, 1956 |
| 2,807,004 | Pouliart | Sept. 17, 1957 |
| 2,890,440 | Burkhart | June 9, 1959 |